US008260445B2

(12) United States Patent
Ichimura (10) Patent No.: US 8,260,445 B2
(45) Date of Patent: Sep. 4, 2012

(54) SIGNAL PROCESSING SYSTEM, SIGNAL TRANSMISSION APPARATUS, SIGNAL RECEIVING APPARATUS, AND PROGRAM

(75) Inventor: Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 853 days.

(21) Appl. No.: 11/860,992

(22) Filed: Sep. 25, 2007

(65) Prior Publication Data

US 2008/0107276 A1 May 8, 2008

(30) Foreign Application Priority Data

Nov. 6, 2006 (JP) ................. 2006-300751

(51) Int. Cl.
*G06F 17/00* (2006.01)
*H04R 5/00* (2006.01)

(52) U.S. Cl. .......................... 700/94; 381/22

(58) Field of Classification Search .............. 700/94; 381/22

See application file for complete search history.

(56) References Cited

U.S. PATENT DOCUMENTS

| 5,502,497 | A  | * | 3/1996  | Yamaashi et al. | 348/473 |
|-----------|----|---|---------|-----------------|---------|
| 6,263,312 | B1 | * | 7/2001  | Kolesnik et al. | 704/500 |
| 6,704,421 | B1 |   | 3/2004  | Kitamura        |         |
| 7,932,954 | B2 | * | 4/2011  | Matsubara et al.| 348/609 |
| 7,987,096 | B2 | * | 7/2011  | Kim et al.      | 704/500 |
| 2001/0020193 | A1 |   | 9/2001 | Teramachi et al.|         |
| 2001/0034601 | A1 | * | 10/2001 | Chujo et al.   | 704/233 |
| 2002/0049735 | A1 |   | 4/2002 | Matsumoto et al.|         |
| 2005/0246179 | A1 | * | 11/2005 | Kraemer        | 704/500 |

FOREIGN PATENT DOCUMENTS

| EP | 1 298 960 A2     | 4/2003  |
| EP | 1 513 349 A2     | 3/2005  |
| JP | 2002-027600      | 1/2002  |
| JP | 2004-023674      | 1/2004  |
| JP | 2005-167929      | 6/2005  |
| JP | 2005-311604      | 11/2005 |
| JP | 2006-050195      | 2/2006  |
| JP | 2006-166447      | 6/2006  |
| JP | 2006-221679      | 8/2006  |
| JP | 2009-526259      | 7/2009  |
| JP | 2009-526262      | 7/2009  |
| WO | WO 01/52533 A2   | 7/2001  |
| WO | WO 03/103289 A1  | 12/2003 |
| WO | WO 2005/109953 A1| 11/2005 |
| WO | WO 2006/013781 A1| 2/2006  |
| WO | WO 2006/088145   | 8/2006  |

OTHER PUBLICATIONS

Office Action issued Dec. 27, 2011 in JP Application No. 2006-300751.

* cited by examiner

*Primary Examiner* — Davetta W Goins
*Assistant Examiner* — Joesph Saunders, Jr.
(74) *Attorney, Agent, or Firm* — Oblon, Spivak, McClelland, Maier & Neustadt, L.L.P.

(57) ABSTRACT

A signal processing system is provided, which includes a first converter for converting first information in to second information, a superimposer for superimposing on the second information control information corresponding to any missing information lost from the first information due to its conversion by the first converter. Furthermore, the signal processing system includes a transmitter for transmitting the second information, a receiver for receiving the second information transmitted from the transmitter, and an extractor for extracting the control information from the second information. The signal processing system also includes a second converter for converting the second information in to third information based on the control information extracted by the extractor, and an output portion for outputting the third information.

1 Claim, 6 Drawing Sheets

| | CT3 | CT2 | CT1 | CT0 | Rsvd | CC2 | CC1 | CC0 |
|---|---|---|---|---|---|---|---|---|
| InfoFrame Type Code | InfoFrame Type = 04₁₀(new) | | | | | | | |
| InfoFrame Version Number | Version = 01₁₀ | | | | | | | |
| Length of Audio InfoFrame | Length of Audio InfoFrame(10) | | | | | | | |
| Data Byte 1 | CT3 | CT2 | CT1 | CT0 | Rsvd | CC2 | CC1 | CC0 |
| Data Byte 2 | Reserved | | | SF2 | SF1 | SF0 | SS1 | SS0 |
| Data Byte 3 | Reserved | | | | | | | |
| Data Byte 4 | CA7 | CA6 | CA5 | CA4 | CA3 | CA2 | CA1 | CA0 |
| Data Byte 5 | DM_INH | LSV3 | LSV2 | LSV1 | LSV0 | Reserved | | |
| Data Byte 6 | Reserved | | | | | | | |
| Data Byte 7 | Reserved | | | | | | | |
| Data Byte 8 | Reserved | | | | | | | |
| Data Byte 9 | Reserved | | | | | | | |
| Data Byte 10 | Reserved | | | | | | | |

FIG.5B

| Byte 1 | Byte 2 | Byte 3 |
|---|---|---|

FIG.6

SIGNAL PROCESSING SYSTEM, SIGNAL TRANSMISSION APPARATUS, SIGNAL RECEIVING APPARATUS, AND PROGRAM

CROSS REFERENCES TO RELATED APPLICATIONS

The present invention contains subject matter related to Japanese Patent Application JP 2006-300751 filed in the Japan Patent Office on Nov. 6, 2006, the entire contents of which being incorporated herein by reference.

BACKGROUND OF THE INVENTION

1. Field of the Invention

The present invention relates to a signal processing system, a signal transmission apparatus, a signal receiving apparatus, and a program.

2. Description of the Related Art

In recent years, with the spread of DVDs (Digital Versatile Disks) and AV amplifiers, ordinary people have also become able to enjoy the benefits of a multi channel (surround) sound used in movies.

When images taken by a normal video camera are reproduced using an AV amplifier compatible with the aforementioned multi channel sound, the normal video camera records only two channel audio signals, resulting in a less realistic audio sensation. To solve this problem, there has been proposed, for example in accordance with Japanese Patent Application Publication JP-A-2005-311604, an information processing system having a function that records a video signal obtained by filming and a multi channel audio signal on a recording medium. With such technology, an attempt has been made to obtain a live sound effect when the image is reproduced.

SUMMARY OF THE INVENTION

Multi channel sound used in the movies and the like is usually provided in a bit stream compressed by Dolby Digital or DTS (Digital Theater Systems). The bit stream includes a number of pieces of sub-information. In a case in which the bit stream is, for example, digitally output by a DVD player and is decoded and reproduced by an AV amplifier, the IEC 60958/61937 standard is used. This standard supports only transmission of the two-channel stereo when the linear PCM (Linear Pulse Code Modulation) is transmitted. The DVD player selects from two transmission methods, that is, to transmit the original bit stream or the down mixed two-channel linear PCM obtained by decoding the original bit stream.

In recent years, the spread of IEEE1394 and HDMI (High Definition Multimedia Interface) made it possible to transmit a multi channel linear PCM even if the original bit stream is a liner PCM. Nevertheless, sub-information of the original bit stream is not superimposed on a multi channel signal. Therefore, there is a problem that appropriate processing cannot be carried out when decoding and reproducing the bit stream by the AV amplifier.

Therefore, it is desirable to provide a new and improved signal processing system, signal transmission apparatus, signal receiving apparatus, and program which allow, when transmitting and utilizing converted information, acquisition of an appropriate output using information lost due to the conversion.

According to an embodiment of the present invention, there is provided a signal processing system including a first converter for converting first information in to second information, a superimposer for superimposing, on the second information, control information corresponding to missing information that is lost from the first information due to conversion by the first converter. Furthermore, the signal processing system includes a transmitter for transmitting the second information, a receiver for receiving the second information transmitted from the transmitter, and an extractor for extracting the control information from the second information. In addition, the signal processing system has a second converter for converting the second information in to third information based on the control information extracted by the extractor, and, an output portion for outputting the third information.

With the above-described configuration, the first converter converts the first information in to the second information. The superimposer superimposes, on the second information, the control information corresponding to the missing information lost from the first information due to the conversion by the first converter. Furthermore, the transmitter transmits the second information on which the control information is superimposed. The second information on which the control information is superimposed is received by the receiver, and the extractor extracts the control information from the second information on which the control information is superimposed. Then, the second converter converts the second information in to the third information based on the control information extracted by the extractor. The converted third information is output by the output portion. In the signal processing system, the information lost from the pre-converted information by conversion is superimposed on the information to be transmitted, and then the information transmission is executed. Consequently, when re-converting the received information, the information can be converted based on the information lost from the pre-converted information.

The first converter may decode a coded audio signal which is the first information and convert the signal in to a multi channel linear audio signal which is the second information. Furthermore, the superimposer may superimpose, on the multi channel linear audio signal, control information for controlling an LFE signal reproduction level of the multi channel linear audio signal based on the coded audio signal. Moreover, the second converter may adjust the LFE signal reproduction level in the multi channel linear audio signal based on the control information and convert the signal in to the third information. With this configuration, the second converter adjusts the reproduction level of the LFE signal in the multi channel linear audio signal based on the control information for controlling the LFE signal reproduction level superimposed on the multi channel linear audio signal. Consequently, it becomes possible to reproduce the multi channel linear audio signal at an appropriate LFE signal reproduction level. In this case, the coded audio signal mentioned above refers to an audio signal that has been encoded.

The superimposer may store the control signal in a certain section of a transmission format for transmitting the second information. With this configuration, the control signal is transmitted after being stored in a certain section of the transmission format for transmitting the second information. Consequently, it becomes possible to transmit the control information without needing to provide a new storage section for the control information.

The superimposer may superimpose, on the second information as the control information, information that indicates content of control that is performed when the second converter converts the second information in to the third information. With this configuration, the second converter is able to convert the second information in to the third information based on the information about the content of the control that is superimposed on the second information as the control information.

The superimposer may superimpose, on the second information as the control information, identification information representing content of control that is performed when the second converter converts the second information in to the third information. With this configuration, the second converter can identify the content of the control performed when the second information is converted in to the third information, based on the identification information superimposed on the second information as the control information. Consequently, the second converter is able to convert the second information in to the third information based on the identified content of the control.

The control information may be identification information for identifying a coding system of the first information. In this case, the encoding system mentioned above refers to information representing a digital data format in which the first information is written.

The control information may be identification information for identifying a type of a recording medium in which the first information is recorded.

The control information may be identification information for identifying a broadcast system corresponding to the first information. In this case, the types of the broadcast systems mentioned above refer to the system for providing broadcasting such as high definition broadcasting, ground-based broadcasting, satellite broadcasting, and the like.

As described above, each pieces of control information is superimposed on the second information and transmitted to the signal receiving apparatus. Due to this operation, the signal receiving apparatus is able to convert the second information in to the third information appropriately.

The first converter may down-convert a high definition video signal, which is the first information, and convert the signal in to a standard-system video signal. Furthermore, the superimposer may superimpose on the standard-system video signal control information representing that the original signal is a high definition video signal. Moreover, the second converter may remove noise from the standard-system video signal based on the control information and convert the signal in to the third information. With this configuration, the second converter removes the noise in the standard-system video signal based on the control information indicating that the signal prior to superimposition on the standard-system video signal was originally a high definition video signal. Consequently, it becomes possible to reproduce the video signal by using the standard-system video signal from which the noise is removed.

According to another embodiment of the present invention described above, there is provided a signal transmission apparatus including a first converter for converting first information in to second information, and a superimposer for superimposing, on the second information, control information corresponding to missing information that is lost from the first information due to conversion by the first converter. In addition, the signal transmission apparatus includes a transmitter for transmitting the second information to a signal receiving apparatus.

With the above-described configuration, the first converter converts the first information in to the second information. The superimposer superimposes, on the second information, the control information corresponding to the missing information lost from the first information due to the conversion by the first converter. The transmitter transmits the second information on which the control information is superimposed to the signal receiving apparatus. In consequence, the control information corresponding to the missing information lost from the first information due to the conversion can be provided to the signal receiving apparatus.

According to yet another embodiment of the present invention described above, there is provided a signal receiving apparatus capable of communicating with a signal transmission apparatus. The signal receiving apparatus includes a receiver for receiving second information which is transmitted from the signal transmission apparatus and on which control information, which corresponds to missing information lost from first information when the first information is converted in to second information, is superimposed. Furthermore, the signal receiving apparatus includes an extractor for extracting the control information from the second information, and a second converter for converting the second information in to third information based on the control information extracted by the extractor. Moreover, the signal receiving apparatus includes an output portion for outputting the third information.

With the above-described configuration, the receiver receives the second information on which the control information is superimposed and which is transmitted from the signal transmission apparatus. In this case, the control information corresponds to the missing information lost from the first information by the conversion of the first information in to the second information. The extractor extracts, from the received second information, the control information corresponding to the missing information lost from the first information. The second converter converts the second information in to the third information based on the extracted control information. The output portion outputs the third information. Consequently, the signal receiving apparatus is able to reproduce the third information by converting the second information in to the third information based on the control information lost due to the conversion by the signal transmission apparatus.

According to yet still another embodiment of the present invention described above, there is provided a program that includes instructions that command a computer to function as a first converting function for converting first information in to second information. The program also includes instructions that direct the computer to function as: a superimposing function for superimposing, on the second information, control information corresponding to missing information lost from the first information due to conversion by the first converting function, and a transmitting function for transmitting the second information.

With the above-described configuration, the computer program is stored in the memory provided in the computer and run by being read by a CPU provided in the computer. Accordingly, the computer is operated to function as a signal transmission apparatus. Furthermore, a computer-readable-recording medium in which the computer program is stored may also be provided. The recording medium is, for example, a magnetic disk, an optical disc, a magnetic optical disk, or a flash memory. In addition, the computer program may be distributed via, for instance, a network without using the recording medium.

According to yet still another embodiment of the present invention described above, there is provided a program that includes instructions that command a computer to function as a receiving function for receiving second information on which control information corresponding to missing information lost from first information when the first information is converted in to the second information is superimposed. The program also includes instructions that command the computer to function as: an extracting function for extracting the control information from the second information, and a second converting function for converting the second information in to the third information based on the extracted control information. In addition, the computer is also commanded to function as an outputting function for outputting the third information.

With the above-described configuration, the computer program is stored in the memory provided in the computer and run by being read by a CPU provided in the computer. Accordingly, the computer is operated to function as a signal transmission apparatus. Furthermore, a computer-readable-recording medium in which the computer program is stored may also be provided. The recording medium is, for example, a magnetic disk, an optical disk, a magnetic optical disk, or a flash memory. In addition, the computer program may be distributed via, for instance, a network without using the recording medium.

According to the embodiments of the present invention described above, it is possible, when transmitting and utilizing the converted information, to perform an appropriate process by using the information lost by the conversion and output the information.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Hereinafter, a signal processing system according to a first embodiment of the invention will be described in detail.

Figure 1:
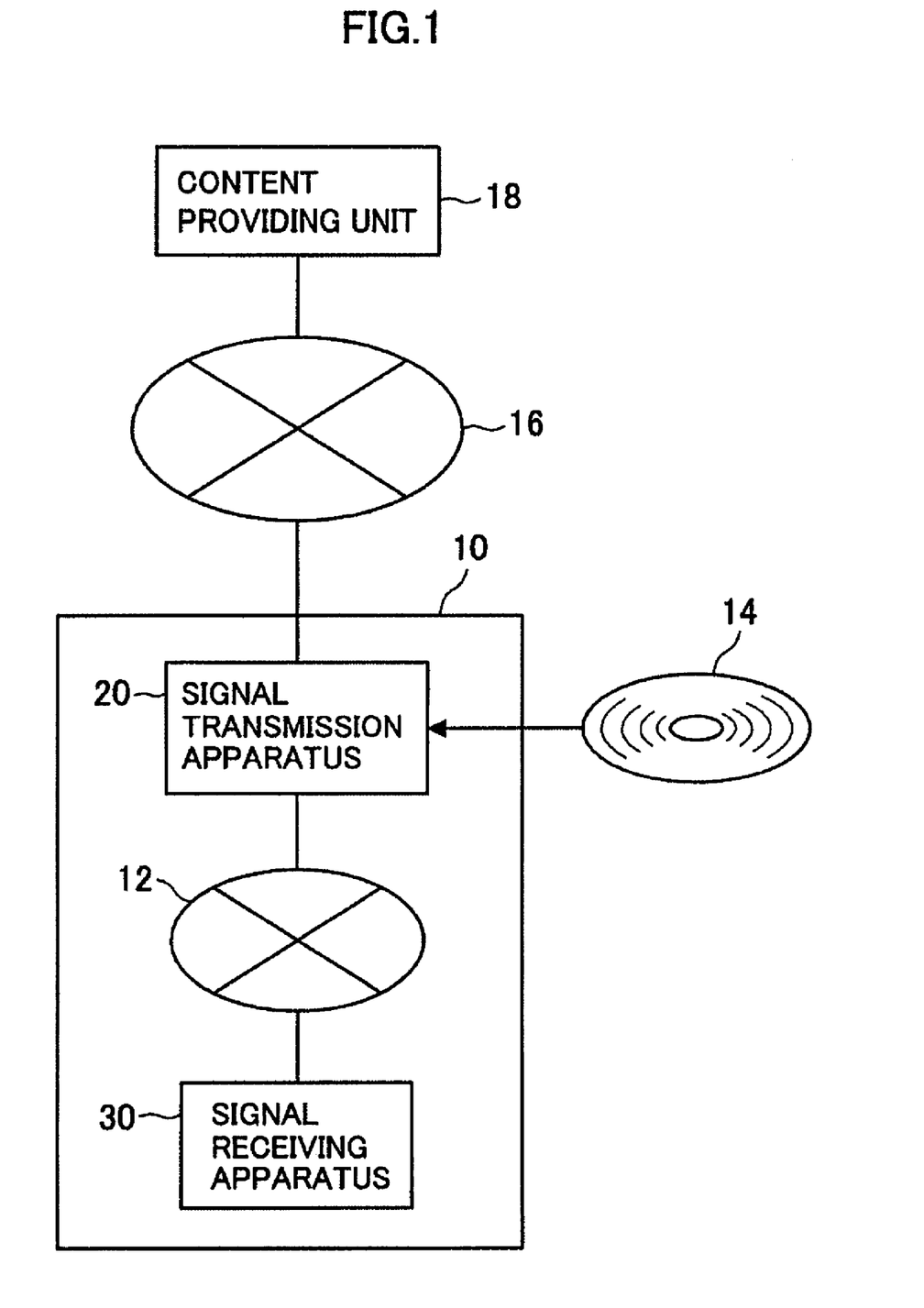
FIG. 1 is an explanatory figure of a signal processing system according to a preferred embodiment of the invention.

FIG. 1 is an explanatory figure of a signal processing system 10 according to the present embodiment. The signal processing system 10 includes, for example, a home network 12, a signal transmission apparatus 20, and a signal receiving apparatus 30.

The home network 12 is a communication line network which connects the signal transmission apparatus 20 and the signal receiving apparatus 30 in such a manner as to enable two-way or one-way communication. This line network includes a wired or wireless dedicated line network such as a LAN (Local Area network), an Ethernet® or a wireless LAN. Furthermore, the signal transmission apparatus 20 may be directly connected, without involving the home network 12, to the signal receiving apparatus 30 by, for instance, a USB (Universal Serial Bus) port, an IEEE1394 port such as i.Link, a SCSI (Small Computer System Interface) port, an RS-232C port, or an optical audio terminal.

A recording medium 14 provides the signal transmission apparatus 20 with various content data such as images and music. The recording medium 14 may be, for example, a magnetic disk, an optical disk, a magnetic optical disk, or a semiconductor memory. Moreover, the recording medium 14 can be, for instance, a CD (Compact Disk) medium, a SACD (Super Audio CD) medium, a Hi-MD medium, a DVD (Digital Versatile Disk) medium, an HD-DVD (High Definition-DVD) medium, a Blu-ray® medium, a Compact Flash® card, a memory stick, or an SD memory card (Secure Digital memory card). Furthermore, the removable recording medium 14 may also be an IC card (Integrated Circuit card) incorporating a noncontact IC chip, an electronic device, or the like.

In this case, the aforementioned content data (hereafter called the 'content') can be chosen content such as, for example, audio content including audio data such as music, lectures, and radio programs, or video content including image data and audio data such as movies, television programs, and video programs.

A communication network 16 is a communication line network which connects the signal processing system 10 according to the present embodiment and a content providing unit 18 in such a manner as to enable one-way or two-way communication. This communication network may include, for instance, a public line network such as the Internet, a telephone line network, a satellite communication network, and a multipoint communication channel, or a dedicated line network such as a WAN (Wide Area Network), a LAN (Local Area Network), an IP-VPN (Internet Protocol Virtual Private Network), an Ethernet®, or a wireless LAN. In this case, the line network can be either wired or wireless. Furthermore, the communication network 16 may be a home network. In addition, the signal processing system 10 may be directly connected, without involving the communication network 16, with the content providing unit 18 by a USB (Universal Serial Bus) port, an IEEE1394 port such as i.Link, an SCSI (Small Computer System Interface) port, an RS-232C port, an optical audio terminal, and the like.

The content providing unit 18 is a device which provides the signal transmission apparatus 20 according to the embodiment with various contents such as images and music. The content providing unit 18 can be a content providing server, a broadcasting station, or the like.

The signal transmission apparatus 20 converts a file format or the like of the content provided by the recording medium 14 or the content providing unit 18. Furthermore, the signal transmission apparatus 20 transmits the converted content to the signal receiving apparatus 30. The signal transmission apparatus 20 can also create new content by self-recording (of sound, images, etc.), ripping, and the like, and store the content in a memory. Note that self-recording refers to recording, as digital data, an image/sound recorded by an imaging device/sound collector provided together with the signal transmission apparatus 20. Moreover, ripping refers to extracting digital content (sound data, image data, and the like) recorded in the recording medium such as a music CD and a video DVD, converting the content in to a file format processable by a computer, and storing the converted content in the memory.

The signal transmission apparatus 20 includes information appliances such as, for example, a personal computer (PC), a portable music player, an AV composer, a data reproducing device (DVD/HDD player and the like), a television, and a radio.

The signal receiving apparatus 30 is a device which receives the converted content transmitted from the signal transmission apparatus 20 and outputs the content. The signal receiving apparatus 30 includes, for example, a speaker with AV amplifier, a headset, and an earphone.

Configuration of the Signal Transmission Apparatus 20

Figure 2:
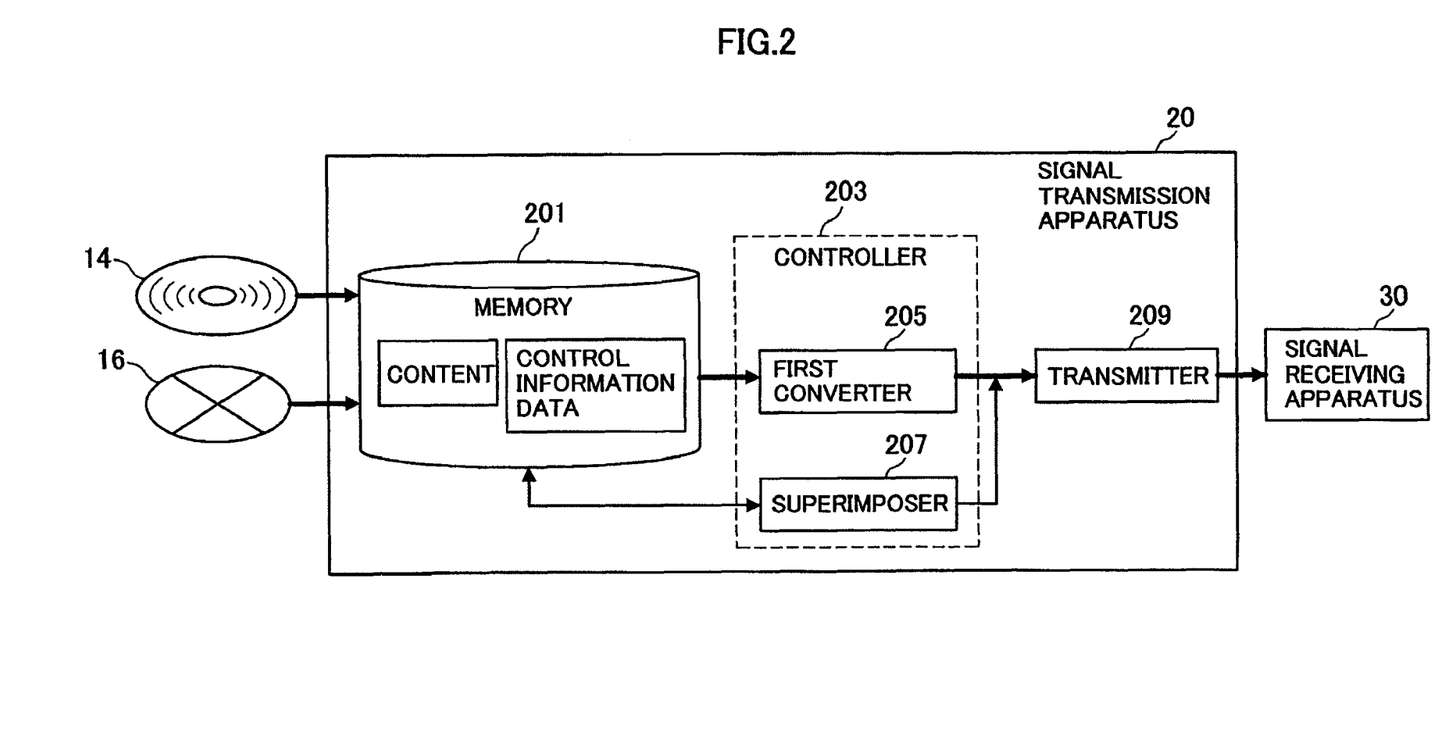
FIG. 2 is a block diagram of a signal transmission apparatus according to the embodiment.

Now referring to FIG. 2, a detailed description will be given of the signal transmission apparatus 20 according to the embodiment of the present invention. FIG. 2 is a block diagram for illustrating the signal transmission apparatus 20 according to the embodiment.

The signal transmission apparatus 20 includes, for instance, a memory 201, a controller 203, and a transmitter 209.

The memory 201 stores the content provided by the recording medium 14 and the communication network 16. Furthermore, the memory 201 stores, as a database, the control information used in conversion of the content data and the like, as well as the control information data, including information related to a file format of the content and the like. In addition to the aforementioned information, the memory 201 may store various parameters the storage of which proves necessary when processing is performed by the signal transmission apparatus 20, as well as various data such as those generated during processing. Furthermore, the memory 201 may also store various programs for controlling the signal transmission apparatus 20. The controller 203 and the transmitter 209 can freely read/write the data out from/in to the memory 201, as necessary.

The memory 201 includes, for example, various types of recording medium. Examples of the recording medium include magnetic disks such as an HDD (Hard Disk Drive) and a flexible disk, nonvolatile semiconductor memories such as an EEPROM (Electrically Erasable Programmable Read-Only memory) and an EPROM (Erasable Programmable Read-Only Memory), optical disks such as a CD-R (Compact Disk Recordable)/RW (Rewritable), a DVD-R (Digital Versatile Disk Recordable)/RW/+R/+RW/RAM, and a BD (Blu-Ray Disc®)-R/BD-RE, and magnetic optical disks such as an MO (Magneto Optical) disk. Furthermore, the recording medium may be a removable recording medium, which is attachable to and detachable from the signal transmission apparatus 20.

The controller 203 includes, for instance, a central processing unit (CPU), a ROM, and a RAM, and is operated as per each program stored in the ROM and the memory 201 to control overall operations of the signal transmission apparatus 20. The controller 203 further includes, for example, a first converter 205 and a superimposer 207.

The first converter 205 converts the content data which is first information in to second information which is data transmitted to the signal receiving apparatus 30. When converting the first information in to the second information, the first converter 205 refers to the control information data stored in the memory 201 to determine a file format and control information of the first information, and converts the first information in to the second information. The file format and the like of the second information may be a file format and the like predetermined by the signal transmission apparatus 20, and a user of the signal transmission apparatus 20 can discretionarily select the file format from those usable by the signal transmission apparatus 20. Furthermore, the first converter may store in the memory 201 the second information created by the conversion.

The first information can be moving image content such as the video content on which data is written in the AC3 (Audio Code number 3) format or DTS format and the video content recorded by high definition video signals, or the music content such as a DVD-Audio and SACD. Moreover, the second information can be compressed signals, or may also be, for example, non-compressed signals for multi channel transmission. Examples of the non-compressed signals for multi channel transmission include multi channel linear signals.

The superimposer 207 superimposes the control information corresponding to the missing information lost from the content data which is the first information obtained by the conversion of the first converter 205, on the second information created by the conversion by the first converter. The superimposer 207 has, for instance, a missing information extracting function for extracting the missing information lost from the first information, and control information superimposing function for superimposing the control information corresponding to the extracted missing information on the second information.

The missing information extracting function of the superimposer 207 refers to the control information data stored in memory 201 to compare the content included in the first information and the content included in the second information. Then, the missing information extracting function extracts the missing information lost from the first information due to the conversion by the first converter 205. Subsequently, the control information superimposing function of the superimposer 207 refers to the control information data stored in the memory 201 to create the control information related to the missing information extracted by the missing information extracting function, and stores the information in the predetermined section of the second information. The predetermined section in which the control information corresponding to the missing information is stored may be a certain section of a transmission format for transmitting the second information to the signal receiving apparatus. Moreover, the certain section of the transmission format can be, for instance, a data area of the transmission format which is not generally used.

In this case, the missing information lost from the first information due to the conversion is, for instance, the control information lost from the first information when the first information is converted in to the second information by changing the file format and the like. Examples of the control information lost from the first information include the control information representing a reproduction level of an LFE signal, the control information representing that the first information was a multi channel signal, the identification information for identifying an encoding system of the first information, the identification information for identifying a type of recording medium which stores the first information, the identification information for identifying a type of broadcast system corresponding to the first information, and the specific speaker arrangement information for the multi channel signals.

In this case, the encoding system refers to a system for compressing the content. In the case of the moving image content, the encoding system can be, for instance, AC3, DTS system, MPEG (Moving Picture Experts Group), and WMV (Windows Media Video). On the other hand, in the case of the music content, the encoding system can be, for instance, DTS (Direct Stream Transfer), ATRAC (Adaptive TRansform Acoustic Coding), ATRAC3, MP3 (MPEG 1 Audio Layer-3), AAC (Advanced Audio Coding), and WMA (Windows Media Audio).

Furthermore, the types of the recording medium include CD media, SACD media, Hi-MD media, DVD media, HD-DVD media, Blu-ray® media, and the like.

Moreover, the types of the broadcast system include high definition broadcasting, ground-based broadcasting, satellite broadcasting, and the like.

The superimposer 207 may superimpose directly on the second information as the missing information, the control content when the information received by the signal receiving apparatus 30 is converted in to the third information. In addition, the superimposer 207 may superimpose, on the second information as the missing information, the identification information representing the control content when the information received by the signal receiving apparatus 30 is converted in to the third information. Examples of cases in which the control content is directly superimposed on the second information include a case in which the control content is related to a control commonly executed by all the signal receiving apparatuses 30 that receive the second information. Moreover, examples of cases in which the identification information representing the control content is superimposed on the second information include a case in which the control content is related to a control executed by some of the signal receiving apparatuses 30 that receive the second information.

Note that the superimposer 207 may store, in the memory 201, the control information corresponding to the extracted missing information and the second information on which the control information is superimposed.

The transmitter 209 transmits the second information on which the control information is superimposed to the signal receiving apparatus 30. The second information on which the control information is superimposed is transmitted to the signal receiving apparatus 30 via the home network 12. Furthermore, when the signal receiving apparatus 30 is directly connected to the signal transmission apparatus 20, the second information on which the control information is superimposed is directly transmitted to the signal receiving apparatus 30 via a connecting port or the like which connects the signal receiving apparatus 30 and the signal transmission apparatus 20.

Configuration of the Signal Receiving Apparatus 30

Figure 3:
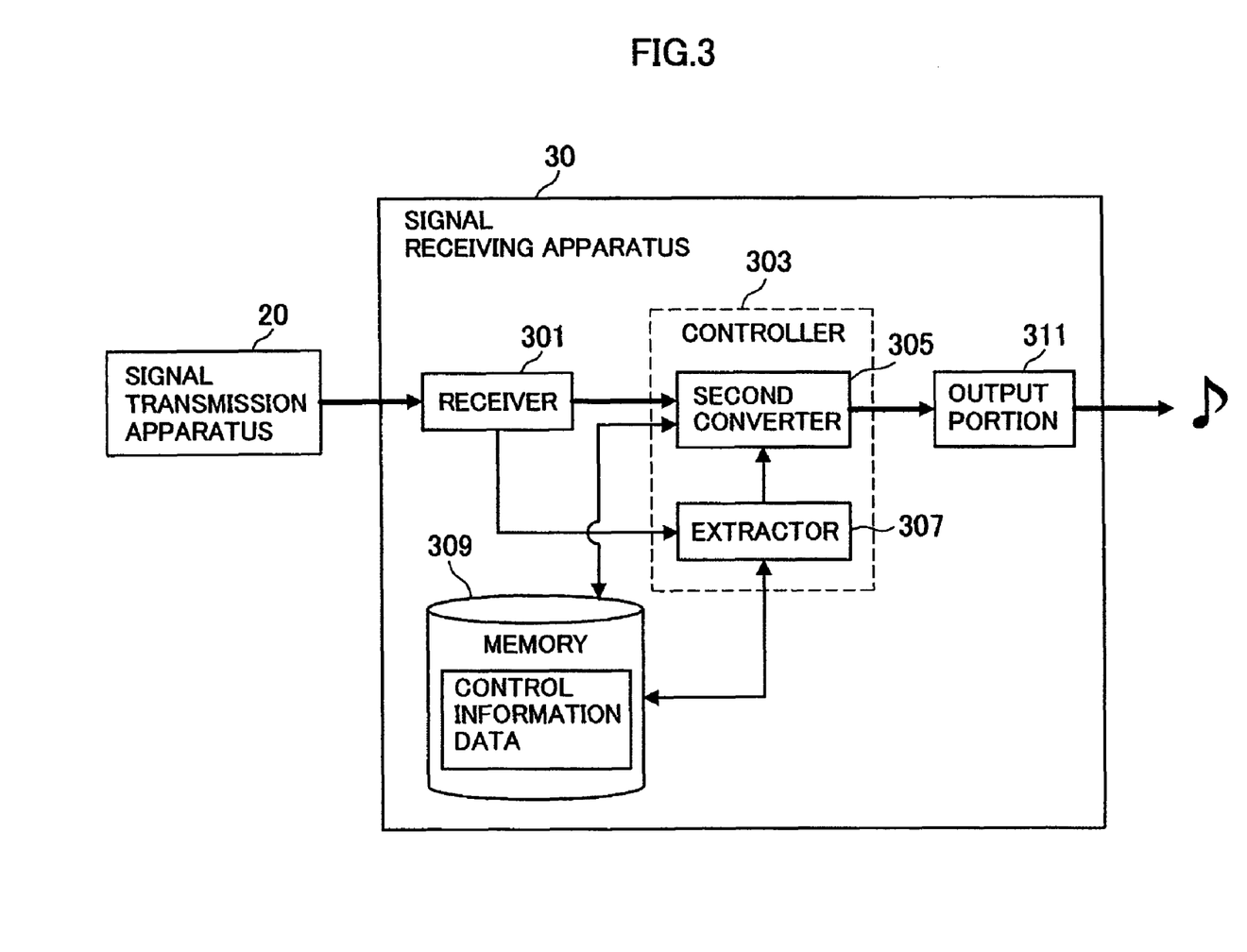
FIG. 3 is a block diagram of a signal receiving apparatus according to the embodiment.

Next, referring to FIG. 3, the signal receiving apparatus 30 according to the embodiment of the present invention will be explained in detail. FIG. 3 is a block diagram illustrating the signal receiving apparatus 30 according to the embodiment of the present invention.

The signal receiving apparatus 30 has, for instance, a receiver 301, a controller 303, a memory 309, and an output portion 311.

The receiver 301 receives the second information on which the control information is superimposed, which is transmitted from the signal transmission apparatus 20, and then transmits the information to the controller 303. In addition, the second information received by the receiver 301 may be stored in the memory 309.

The controller 303 includes, for instance, a central processing unit (CPU), a ROM, and a RAM, and is operated as per each program stored in the ROM and the memory 309 to control the overall operations of the signal receiving apparatus 30. The controller 303 further includes, for example, a second converter 305 and an extractor 307.

The second converter 305 converts the second information received by the receiver 301 in to the third information based on the control information extracted by the extractor 307 and the control information data stored in the memory 309. In this case, the third information is information which can be output by the output portion 311 of the signal receiving apparatus 30. A file format and the like of the third information created by the conversion can be a file format and the like predetermined by the signal receiving apparatus 30. Furthermore, a user of the signal receiving apparatus 30 can discretionarily select the file format of the third information created by the conversion from those usable by the signal receiving apparatus 30. Furthermore, the second converter may store in the memory 309 the third information created by the conversion.

The extractor 307 refers to the control information data stored in the memory 309 to determine the second information received by the receiver 301, and extracts the control information from the second information. Once the control information is extracted from the second information, the extractor 307 informs the second converter 305 of the extracted control information. In addition, the extractor 307 may store the extracted control information in the memory 309.

The memory 309 stores, as a database, the control information used in the conversion of the content data and the like, as well as the control information data including information related to a content file format and the like. In addition to the aforementioned information, the memory 309 may store various parameters the storage of which proves to be necessary when processing is performed by the signal receiving apparatus 30, as well as various data such as those generated during processing. Furthermore, the memory 309 may also store various programs for controlling the signal receiving apparatus 30. Moreover, the memory 309 may store the second information received by the signal receiving apparatus 30 and the third information created by conversion in the second converter 305. The receiver 301, the controller 303, and the output portion 311 can freely read/write the data out from/in to the memory 309 as necessary.

The output portion 311 outputs the third information created by the second converter 305 via an output function provided in the signal receiving apparatus 30. In this case, when the second information received by the signal receiving apparatus 30 is video content, the output portion 311 outputs the third information via an image display function and a sound output function provided in the signal receiving apparatus 30. Furthermore, when the second information received by the signal receiving apparatus 30 is music content, the output portion 311 outputs the third information via the sound output function provided in the signal receiving apparatus 30.

Hereinabove, a description was given of an example of the functions of the signal transmission apparatus 20 and the signal receiving apparatus 30 according to the embodiment of the present invention. However, each component above can be configured using a multi-purpose member or circuit or by hardware having the specific function of each component. Also, the function of each component may be executed solely by a CPU or the like. Accordingly, the configuration to be used can be changed appropriately in accordance with the relevant technical level available at the time the embodiment is implemented.

FIRST EXAMPLE

When the First Information is a Coded Audio Signal

Next, the operation of the signal transmission apparatus 20 and the signal receiving apparatus 30 according to the embodiment will be described in detail taking a case in which the first information is a coded audio signal as an example. In the first example, which will be explained hereinafter, a description will be given of a case in which the signal transmission apparatus 20 is a DVD player and the signal receiving apparatus 30 is a speaker with an AV amplifier. However, the signal transmission apparatus 20 and the signal receiving apparatus 30 according to the embodiment of the present invention are not limited to the examples described below.

In recent years, with the spread of IEEE1394 and HDMI, it has become possible to transmit a linear PCM which is a non-compressed data as a multi channel linear audio signal. Nevertheless, sub-information of the original bit stream is not superimposed on a multi channel signal. Furthermore, a DVD-AUDIO utilizes transmission of the multi channel linear audio signals to send out signals for music and not for movies. This type of the multi channel music signal transmission method includes, in addition to the linear PCM, a One Bit Audio signal for transmitting a DSD (Direct Stream Digital) signal used in the SACD.

In the case of an LFE signal for movies, the content is created assuming that the signal level is increased by +10 dB in an analogue area during signal reproduction. On the other hand, the signal level does not change in the case of a music multi channel signal. Therefore, when both of the signals are transmitted from the DVD player to the AV amplifier using the same multi channel transmission method, the signals cannot be distinguished.

In the case of content transmission using IEEE1394, a signal format of the content at the content transmission side and the content receiving side is determined in a one-to-one relation. Accordingly, the aforementioned phenomenon does not become a major problem. However, since HDMI is a general multi channel signal, a unique signal is not transmitted to the first information. Consequently, a problem such as that mentioned above may occur when reproducing the transmitted data.

Figure 4:
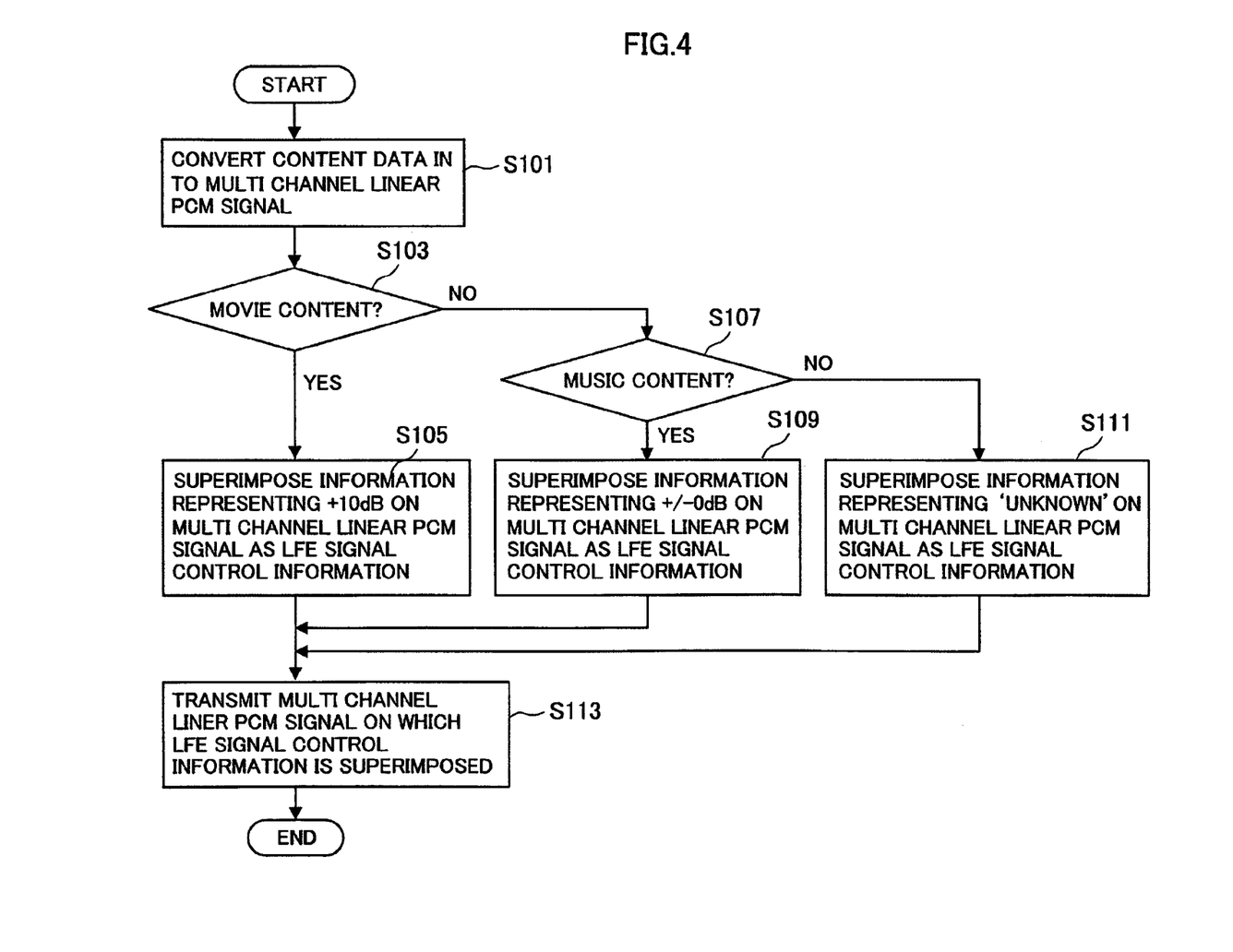
FIG. 4 is a flow chart illustrating a case in which the signal transmission apparatus according to the embodiment superimposes control information related to an LFE signal and transmits the content.

Hereinafter, referring to FIGS. 4 to 6, an operation of the signal transmission apparatus 20 and the signal receiving apparatus 30 according to the first example will be described. FIG. 4 is a flow chart that illustrates a case in which the signal transmission apparatus 20 according to the first example superimposes the control information related to the LFE signals and transmits the content.

Prior to an explanation of the flow chart in FIG. 4, it should be noted that the signal transmission apparatus 20 according to the first example is provided with the content transmitted from the DVD media, and such content is stored in the memory 201.

Firstly, the first converter 205 of the signal transmission apparatus 20 obtains the content stored in the memory 201, and converts the content data in to a linear PCM signal which is a multi channel linear audio signal (step S101). The content data provided by the DVD media is, for example, written in an AC3 format. Therefore, the first converter 205 first refers to the control information data stored in the memory 201, and obtains the information related to the format of the coding method, which is the AC3 format. Subsequently, the first converter 205 decodes the data written in the AC3 format based on the control information data obtained from the memory 201. Then, the first converter 205 refers to the control information data stored in the memory 201 and obtains the information related to the multi channel linear PCM signal format. Thereafter, the first converter 205 converts the decoded content in to a multi channel linear PCM signal based on the control information data obtained. Once the conversion in to the multi channel linear PCM signal is completed, the first converter 205 temporarily stores in the memory 201 the created content of the multi channel linear PCM signal format.

Subsequently, the superimposer 207 of the signal transmission apparatus 20 refers to the control information data stored in the memory 201, and compares the data of the AC3 format which is the first information and the data of the multi channel linear PCM signal format which is the second information. Then, the superimposer 207 extracts the lost data lost from the AC3 format-data due to the conversion by the first converter 205. As a result of the comparison, the superimposer 207 recognizes that the control information related to an LFE signal reproduction level is lost, and superimposes the control information related to the LFE signal reproduction level on the data of the multi channel linear PCM signal format, which is the second information.

The superimposer 207 first determines if the content of the first information is for movies (step S103). The superimposer 207 makes this determination by, for example, comparing the file format of the content, the information written in the content data format and the like, with the control information data stored in the memory 201. If it is determined that the content of the first information is for movies, the superimposer 207 superimposes the information representing increasing of the LFE signal by +10 dB on the multi channel linear PCM signal as LFE signal control information (step S105). On completion of the superimposition of the control information, the superimposer 207 stores in the memory 201 the multi channel linear PCM signal on which the control information is superimposed, and transmits the multi channel linear PCM signal to the transmitter 209.

On the other hand, if it is determined that the content of the first information is not for movies, the superimposer 207 continues to determine if the content is for the music (step S107). In this case, as before, the superimposer 207 can make a determination by, for example, referring to the file format of the content, the information written in the content data format and the like. If it is clarified that the content of the first information is for the music, the superimposer 207 superimposes the information representing increasing of the LFE signal by +/−0 dB on the multi channel linear PCM signal as the LFE signal control information (step S109). On completion of the superimposition of the control information, the superimposer 207 stores in the memory 201 the multi channel linear PCM signal on which the control information is superimposed, and transmits the multi channel linear PCM signal to the transmitter 209.

In addition, if it is determined that the content is neither movie content nor music content, the superimposer 207 superimposes the information representing that the LFE signal reproduction level is unknown on the multi channel linear PCM signal as the LFE signal control information (step S111). On completion of the superimposition of the control information, the superimposer 207 stores in the memory 201 the multi channel linear PCM signal on which the control information is superimposed, and transmits the multi channel linear PCM signal to the transmitter 209.

At this stage, the superimposer 207 directly stores the control information related to the LFE signal reproduction level, in a certain section of the multi channel linear PCM signal, as the information representing the LFE signal reproduction level.

TABLE 1

| Bit 1 | Bit 2 | LFE signal reproduction level |
|-------|-------|-------------------------------|
| 0 | 0 | Unknown |
| 0 | 1 | +/−0 dB |
| 1 | 0 | +10 dB |
| 1 | 1 | Reserve |

Of the 2-bit information shown above, the '0, 0' data representing the unknown level is also used to ensure compatibility with previously transmitted content. The actual processing is performed by the speaker with AV amplifier, which is the signal receiving apparatus 30. Moreover, the data represented by '1, 1' is a portion kept as a reserve, and can be used when transmitting a new setting as the LFE signal reproduction level.

Figure 5A:
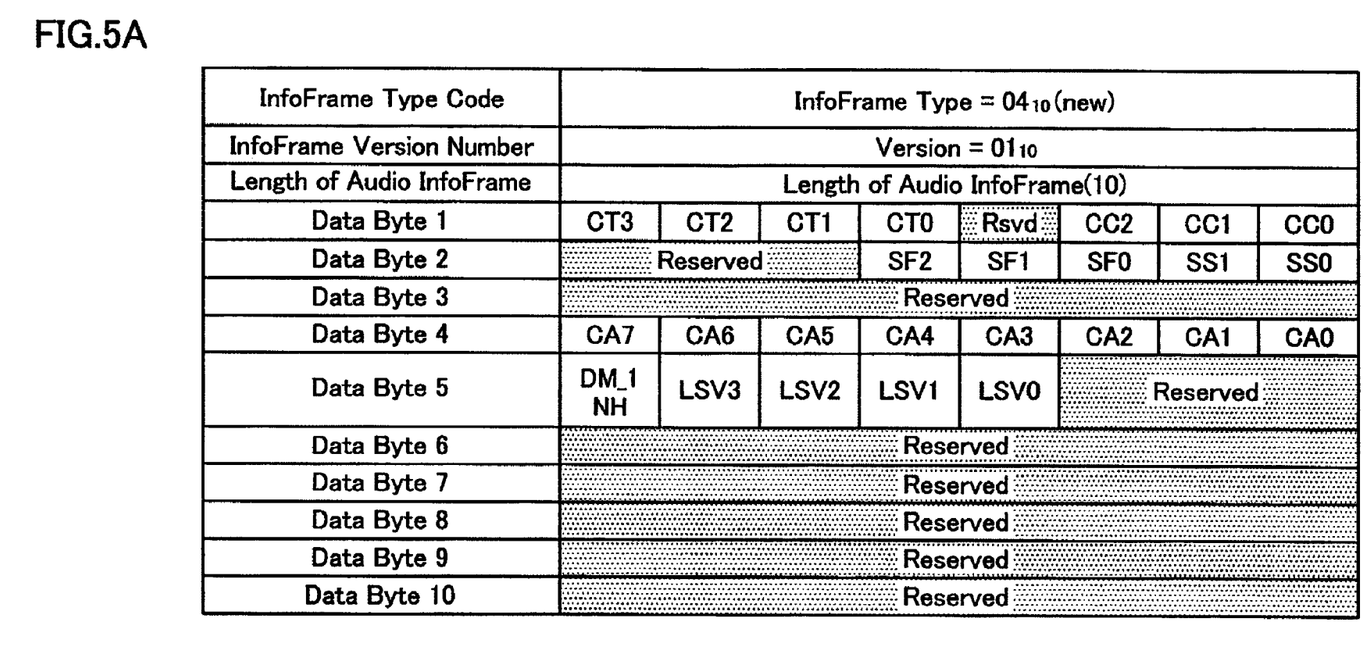
FIG. 5 is an illustration of a section in which the signal transmission apparatus according to the embodiment stores the control information related to the LFE signal.
Figure 5B:
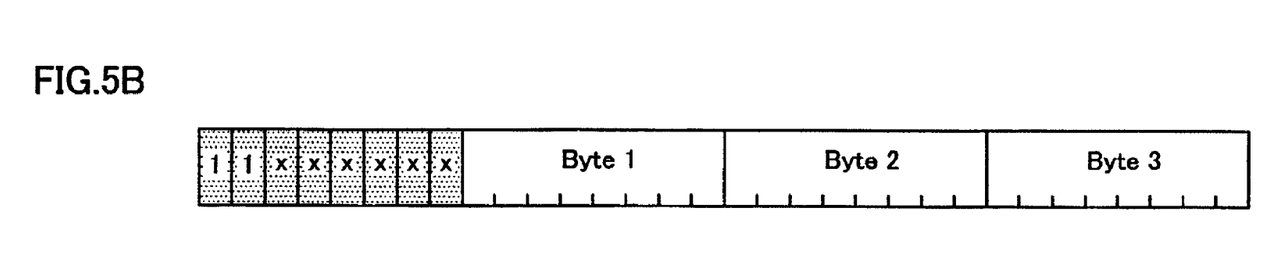
Figure 6:
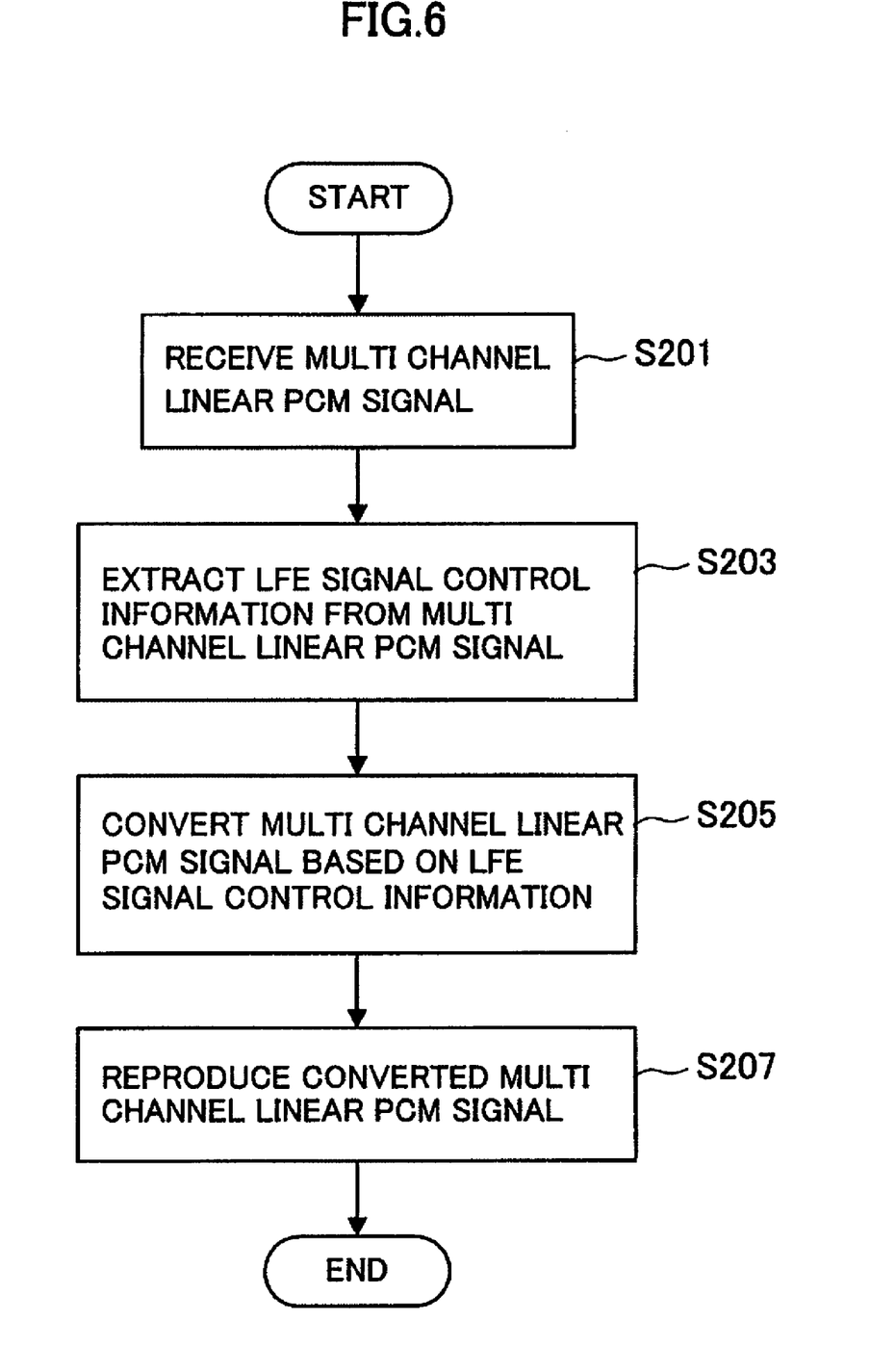
FIG. 6 is a flow chart illustrating a case in which the signal receiving apparatus according to the embodiment outputs the content on which the control information related to the LFE signal is superimposed.

An area in which the LFE signal control information is stored is, for instance, a certain section in the transmission format of the content as shown in FIG. 5. When the multi channel linear PCM signal created by the first converter 205 is transmitted via HDMI, the LFE signal control information is stored in, for example, the Audio InfoFrame of CEA-861. The storage section can be an area provided as 'reserved' as shown in FIG. 5A. Furthermore, when the multi channel linear PCM signal is transmitted via IEEE1394, the LFE signal control information is stored in, for example, the Ancillary Data. The storage section can be an area indicated by 'x' in FIG. 5B.

As described above, the multi channel linear PCM signal on which the LFE signal control information is superimposed is transmitted to the signal receiving apparatus 30 by the transmitter 209 of the signal transmission apparatus 20 (step S113).

Now, referring to FIG. 6, an operation of the signal receiving apparatus 30 according to the first example will be described in detail. FIG. 6 is a flow chart that illustrates a case in which the signal receiving apparatus according to the first example outputs the content on which the control information related to the LFE signal is superimposed.

Firstly, the receiver 301 of the speaker with AV amplifier, that is, the signal receiving apparatus 30, receives a multi channel linear PCM signal transmitted from the DVD player, which is the signal transmission apparatus 20 (step S201). Then, the receiver 301 stores the received multi channel linear PCM signal in the memory 309, and also transmits the received multi channel linear PCM signal to the second converter 305 and the extractor 307.

Subsequently, the extractor 307 analyzes the multi channel linear PCM signal transmitted from the receiver by referring to the control information data stored in the memory 309, and extracts the control information superimposed on the multi channel linear PCM signal (step S203). In the first example, the extractor 307 extracts the LFE signal control information from the multi channel linear PCM signal. After extracting the control information, the extractor 307 stores the extracted control information in the memory 309, and also transmits the extracted control information to the second converter 305.

Then, the second converter 305 converts the multi channel linear PCM signal transmitted from the receiver 301, based on the control information transmitted from the extractor 307 (step S205). In the first example, the second converter 305 adjusts the LFE signal reproduction level of the multi channel linear PCM signal based on the LFE signal control information extracted from the extractor 307. Then, the second converter 305 executes conversion in to the multi channel linear PCM signal with the adjusted LFE signal reproduction level.

Upon completion of the conversion, the second converter 305 stores the multi channel linear PCM signal with the adjusted LFE signal reproduction level in the memory 309, and also transmits the multi channel linear PCM signal with the adjusted LFE signal reproduction level to the output portion 311.

Finally, the output portion 311 reproduces the multi channel linear PCM signal which is the third information created by the second converter, and outputs the signal to outside of the signal receiving apparatus (step S207). In the first example, the multi channel linear PCM signal with the adjusted LFE signal reproduction level is output to outside of the signal receiving apparatus 30, which is the speaker with the AV amplifier, via a plurality of the speakers.

As described above, the signal transmission apparatus 20 superimposes the information defining the LFE reproduction level on a signal transmitted to the home network 12, which is the digital transmission channel, and then transmits the signal. The signal receiving apparatus 30 sets a correct LFE signal reproduction level based on the superimposed information, which defines the LFE reproduction level. In consequence, the LFE reproduction level balance intended at the time of the creation of the content can be achieved.

SECOND EXAMPLE

When Multi Channel Audio Data is Down Converted for Transmission

Next, as a second example, a brief description will be given of a case in which the multi channel audio data which is the first information in this case is down converted in to the stereo audio data for transmission.

It should be noted that the signal transmission apparatus 20 according to the second example stores the multi channel audio data in the memory 201.

Firstly, the first converter 205 of the signal transmission apparatus 20 obtains the multi channel audio data stored in the memory 201, and down converts the multi channel audio data in to stereo audio data by referring to the control information data stored in the memory 201. On completion of the conversion in to the stereo audio data, the first converter 205 temporarily stores the created stereo audio data in the memory 201.

Subsequently, the superimposer 207 of the signal transmission apparatus 20 refers to the control information data stored in the memory 201, and compares the multi channel audio data, which is the first information, and the stereo audio data, which is the second information. Then, the superimposer 207 extracts the missing information lost from the multi channel audio data due to the conversion by the first converter 205. As a result of the comparison, the superimposer 207 recognizes that the information indicating that the pre-converted original data is the multi channel audio data is lost. Then, the superimposer 207 superimposes the missing information indicating that the pre-converted original data is the multi channel audio data, on a transmission format of the stereo audio data. After superimposing the missing information, the superimposer 207 stores in the memory 201 the stereo audio data on which the missing information is superimposed. At the same time, the superimposer 207 transmits to the transmitter 209 the stereo audio data on which the missing information is superimposed.

Then, the stereo audio data on which the missing information is superimposed is transmitted to the signal receiving apparatus 30 by the transmitter 209 of the signal transmission apparatus 20.

Firstly, the receiver 301 of the signal transmission apparatus 30 receives the stereo audio data transmitted from the signal transmission apparatus 20. Then, the receiver 301 stores the received stereo audio data in the memory 309, and also transmits the received stereo audio data to the second converter 305 and the extractor 307.

Subsequently, the extractor 307 analyzes the stereo audio data transmitted from the receiver by referring to the control information data stored in the memory 309, and extracts the missing information superimposed on the stereo audio data. In the second example, the extractor 307 extracts, from the stereo audio data, the information indicating that the original data is the multi channel audio data. After extracting the information, the extractor 307 stores the extracted information in the memory 309 and also transmits the extracted information to the second converter 305.

Then, the second converter 305 attempts to convert the stereo audio data transmitted from the receiver 301 based on the information transmitted from the extractor 307. In the second example, the information extracted by the extractor 307 is the information indicating the signal format of the original data. Therefore, the second converter 305 transmits the stereo audio data to the output portion 311 without converting the data.

Finally, the output portion 311 reproduces the stereo audio data and outputs the data to outside of the signal receiving apparatus 30. In the second example, the stereo audio data is output to outside of the signal receiving apparatus 30 via a speaker. In addition, an indication that the original data is the multi channel audio data is displayed via the image display function of the signal receiving apparatus 30.

As described above, the signal transmission apparatus 20 superimposes the information indicating that the original data is multi channel audio data on a signal transmitted to the home network 12 which is the digital transmission channel, and then transmits the signal. The signal receiving apparatus 30 can thus reproduce the content while displaying the information indicating that the original data is multi channel audio data.

THIRD EXAMPLE

When the First Information is a High Definition Video Signal

Next, as a third example, a brief description will be given of a case in which the first information is image content including a high definition video signal, and such image content is down converted to a standard-system video signal for transmission. In this case, the high definition video signal is a signal used for High Definition Television (HDTV) broadcasting, and the standard-system video signal is a signal used for Standard Definition Television (SDTV) broadcasting.

It should be noted that the signal transmission apparatus 20 according to the third example is provided by a broadcast station with image content including a high definition video signal. Furthermore, the provided content is stored in the memory 201.

Firstly, the first converter 205 of the signal transmission apparatus 20 obtains the image content including a high definition video signal stored in the memory 201. Then, the first converter 205 refers to the control information data stored in the memory 201, and recognizes that the pre-converted first information is the image content including the high definition video signal. Subsequently, the first converter 205 down converts the image content including the high definition video signal in to the image content including the standard-system video signal based on the control information data obtained from the memory 201. Once the conversion in to the standard-system video signal is completed, the first converter 205 temporarily stores the created image content in the memory 201 including the standard-system video signal.

Thereafter, the superimposer 207 of the signal transmission apparatus 20 refers to the control information data stored in the memory 201, and compares the image content including the high definition video signal, which is the first information and the image content including the standard-system video signal, which is the second information. Then, the superimposer 207 extracts the missing information lost from the image content due to the conversion by the first converter 205 including the high definition video signal. As a result of the comparison, the superimposer 207 confirms that the image quality has been degraded by the down conversion of the high definition video signal. Then, the superimposer 207 refers to the control information data stored in the memory 201, and superimposes, on a transmission format section of the image content including the standard-system video signal, a structure including an ID indicating that 'the information is obtained by the down conversion of the high definition video signal' and the control information related to a noise removal process of the down converted image content. Once the superimposition of the structure is completed, the superimposer 207 stores in the memory 201 the image content including the standard-system video signal on which the structure is superimposed. At the same time, the superimposer 207 transmits to the transmitter 209 the image content including the standard-system video signal on which the structure is superimposed.

Thereafter, the image content including the standard-system video signal on which the structure is superimposed is transmitted to the signal receiving apparatus 30 by the transmitter 209 of the signal transmission apparatus 20.

The image content transmitted from the signal transmission apparatus 20 is received by the receiver 301 of the signal receiving apparatus 30. Then, the receiver 301 stores the received image content in the memory 309, and also transmits the received image content to the second converter 305 and the extractor 307.

Subsequently, the extractor 307 analyzes the image content transmitted from the receiver by referring to the control information data stored in the memory 309, and recognizes that the image content is the content including the standard-system video signal and that the structure including the ID and the control information is superimposed. In the third example, the extractor 307 extracts, from the image content including the standard-system video signal, the information indicating that the original content is the image content including the high definition video signal and the control information related to the noise removal process of the image content. After extracting the control information, the extractor 307 stores the extracted control information in the memory 309, and also transmits the extracted control information to the second converter 305.

Thereafter, the second converter 305 converts the image content data including the standard-system video signal transmitted from the receiver 301 based on the control information transmitted from the extractor 307. In the third example, if the signal receiving apparatus 30 is a system that is capable of reproducing the high definition video signals, the second converter 305 carries out the noise removal process of the image content including the standard-system video signal based on the control information extracted from the extractor 307. Then, the second converter 305 converts the image content in to those with a corrected image quality. After completing the conversion, the second converter 305 stores the image content with the corrected image quality in the memory 309, and also transmits the image content with the corrected image quality to the output portion 311.

Finally, the output portion 311 reproduces the image content with the corrected image quality, which is the third information, created by the second converter, and outputs the image content to outside of the signal receiving apparatus 30. In the third example, the image content with the corrected image quality is output to outside of the signal receiving apparatus 30 via the image display function of the signal receiving apparatus 30.

As described above, the signal transmission apparatus 20 superimposes, on the signal transmitted to the home network 12 which is the digital transmission channel, the structure including the information indicating that the original content is the image content including the high definition video signal as well as the control information for the noise removal process. Then, the signal transmission apparatus 20 carries out the transmission. Thereafter, the signal receiving apparatus 30 is able to carry out the noise removal process of the image content by referring to the superimposed structure.

It should be noted that the third example addressed a case in which the image content including the high definition signal, which is the first information, is down converted in to the image content including the standard-system video signal, which is the second information. However the embodiment is not limited to the case of the image content. For instance, when music content using SACD as a sound source is the first information, and such music content is down converted and transmitted to the signal receiving apparatus, a structure including an ID indicating that the sound source is SACD as well as the control information for sound quality correction may be superimposed on the converted content data and transmitted.

FOURTH EXAMPLE

When the First Information Includes Information Related to a Speaker Arrangement Next, as a fourth example, a brief description will be given of a case in which the information related to a special speaker arrangement is included as part of first information.

It should be noted that the signal transmission apparatus 20 according to the fourth example stores the content created by a special speaker arrangement (for example, the content created by arranging one speaker out of a plurality of speakers on the ceiling) in the memory 201.

Firstly, the first converter 205 of the signal transmission apparatus 20 obtains the content created by the special speaker arrangement, which is stored in the memory 201. Then, the first converter 205 refers to the control information data stored in the memory 201, and converts the content in to multi channel linear audio data. After completing the conversion in to multi channel linear audio data, the first converter 205 temporarily stores the resulting multi channel linear audio data in the memory 201.

Subsequently, the superimposer 207 of the signal transmission apparatus 20 refers to the control information data stored in the memory 201, and compares the content created by the special speaker arrangement, which is the first information, and the multi channel linear audio data, which is the second information. Then, the superimposer 207 extracts the missing information lost from the content created by the special speaker arrangement due to the conversion by the first converter 205. As a result of the comparison, the superimposer 207 recognizes that the information related to the speaker arrangement has been lost. Thereafter, the superimposer 207 refers to the control information data stored in the memory 201, and superimposes a structure including an ID representing each speaker in the speaker arrangement as well as the control information for reproducing the special speaker arrangement on to the transmission format section of the multi channel linear audio data. After completing the superimposition of the structure, the superimposer 207 stores in the memory 201 the multi channel linear audio data on which the structure is superimposed and also transmits the multi channel linear audio data on which the structure is superimposed to the transmitter 209.

Thereafter, the multi channel linear audio data on which the structure is superimposed is transmitted to the signal receiving apparatus 30 by the transmitter 209 of the signal transmission apparatus 20.

The multi channel linear audio data transmitted from the signal transmission apparatus 20 is received by the receiver 301 of the signal receiving apparatus 30. Then, the receiver 301 stores the received audio data in the memory 309, and also transmits the received audio data to the second transmitter 305 and the extractor 307.

Subsequently, the extractor 307 analyzes the data transmitted from the receiver by referring to the control information data stored in the memory 309, and recognizes that the structure, including the ID and the control information, is superimposed. In the fourth example, the extractor 307 extracts, from the multi channel linear audio data, the information indicating that the content is created by the special speaker arrangement as well as the control information for reproducing the sound effect obtained by the special speaker arrangement. After extracting the control information, the extractor 307 stores the extracted control information in the memory 309, and also transmits the extracted control information to the second converter 305.

Thereafter, the second converter 305 converts the multi channel linear audio data transmitted from the receiver 301 based on the control information transmitted from the extractor 307. In the fourth example, based on the control information extracted from the extractor 307, the second converter 305 carries out a process for reproducing the sound effect obtained by the special speaker arrangement, and converts the data in to content that reproduces the speaker arrangement. After completing the conversion, the second converter 305 stores in the memory 309 the content that reproduces the sound effect obtained by the special speaker arrangement, and also transmits the content to the output portion 311.

Finally, the output portion 311 reproduces the content that reproduces the sound effect obtained by the special speaker arrangement, which is the third information, created by the second converter, and outputs the content to outside of the signal receiving apparatus 30. In the fourth example, the content that reproduces the sound effect obtained by the special speaker arrangement is output to outside of the signal receiving apparatus 30 via a plurality of speakers of the signal receiving apparatus 30.

As described above, the signal transmission apparatus 20 superimposes, on a signal transmitted to the home network 12, which is the digital transmission channel, the structure including the information indicating that the content is created by the special speaker arrangement as well as the control information for reproducing the sound effect obtained by the special speaker arrangement. Then, the signal transmission apparatus 20 carries out transmission. Thereafter, the signal receiving apparatus 30 is able to reproduce the sound effect obtained by the special speaker arrangement by referring to the superimposed structure.

It should be understood by those skilled in the art that various modifications, combinations, sub-combinations and alterations may occur depending on design requirements and other factors in so far as they are within the scope of the appended claims or the equivalents thereof.

For example, in the embodiments described above, an explanation was given of the cases in which the content is temporarily stored in each memory of the signal transmission apparatus 20 and the signal receiving apparatus 30. Nevertheless, the embodiments of the present invention are not restricted to the aforementioned examples and are also applicable to content streaming reproduction.

Furthermore, in the second and third examples, an explanation was given of the case in which the original content is down converted. However, the embodiments of the present invention are also applicable to a case in which the original content is up-converted. In this case, the information that the original content is extended is treated as the missing information lost when the conversion is performed by the signal transmission apparatus 20. By transmitting the content by superimposing thereon the information that the original content is extended, the signal transmission apparatus 20 can display an indication representing that the data format is extended from the original data in the signal receiving apparatus 30. In addition, the signal transmission apparatus 20 can carry out a process for correcting any sound quality degradation and the like caused by data extension.

What is claimed is:
1. A signal processing system, comprising:
a first converter configured to convert first information into second information;
a superimposer configured to superimpose, on the second information, control information corresponding to a missing information that is lost from the first information due to conversion by the first converter;
a transmitter configured to transmit the second information;
a receiver configured to receive the second information transmitted from the transmitter;
an extractor configured to extract the control information from the second information;
a second converter configured to convert the second information into third information based on the control information extracted by the extractor; and
an output portion configured to output the third information, wherein
the first converter is configured to decode a coded audio signal as the first information and to convert the coded audio signal into a multi channel linear audio signal as the second information,
the superimposer is configured to superimpose, on the multi channel linear audio signal, control information to control a low frequency enhancement (LFE) signal reproduction level of the multi channel linear audio signal based on the coded audio signal, and
the second converter is configured to adjust the LFE signal reproduction level in the multi channel linear audio signal based on the control information and to convert the multi channel linear audio signal into the third information.

* * * * *